United States Patent Office 3,291,269
Patented Dec. 13, 1966

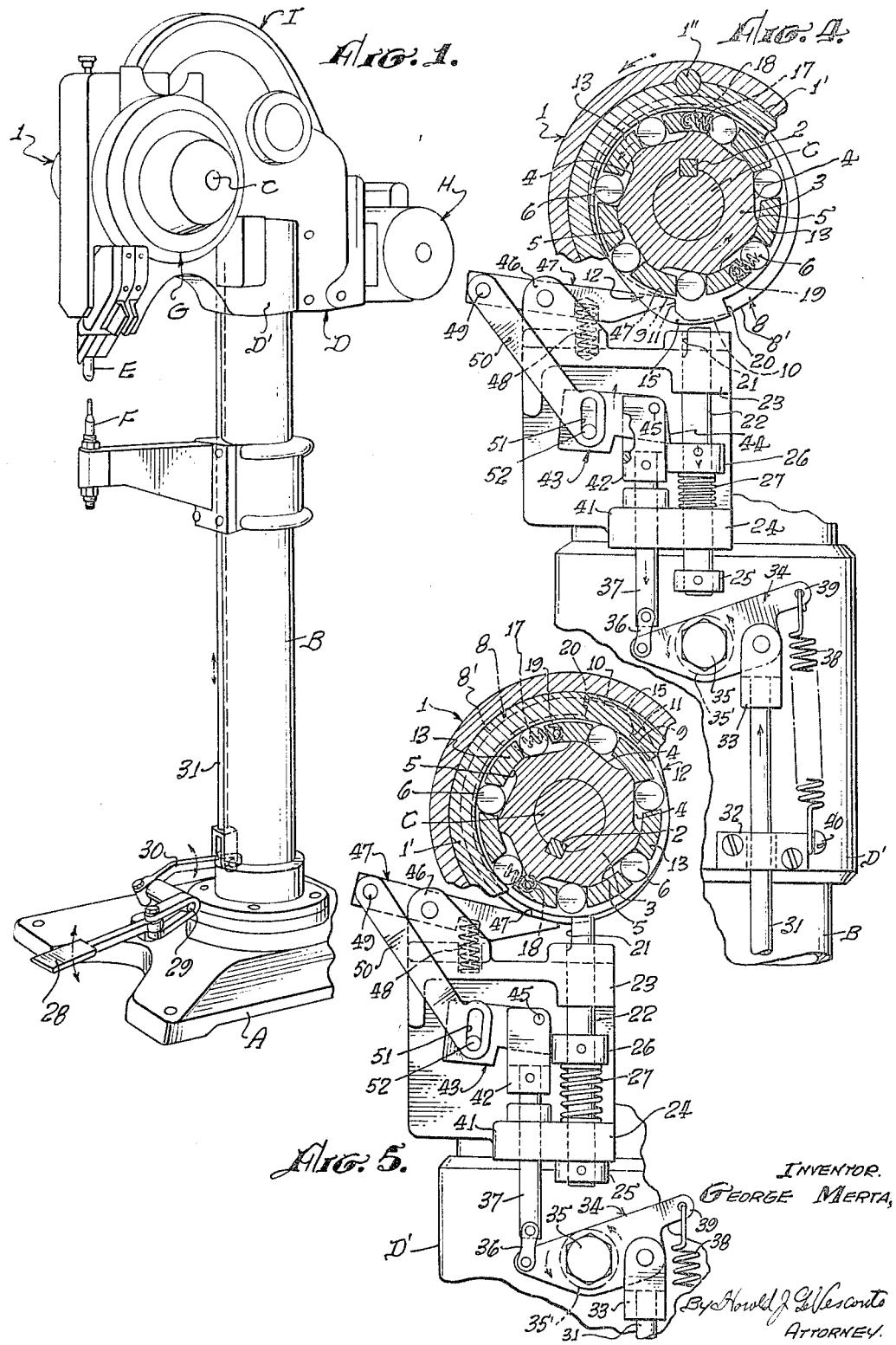

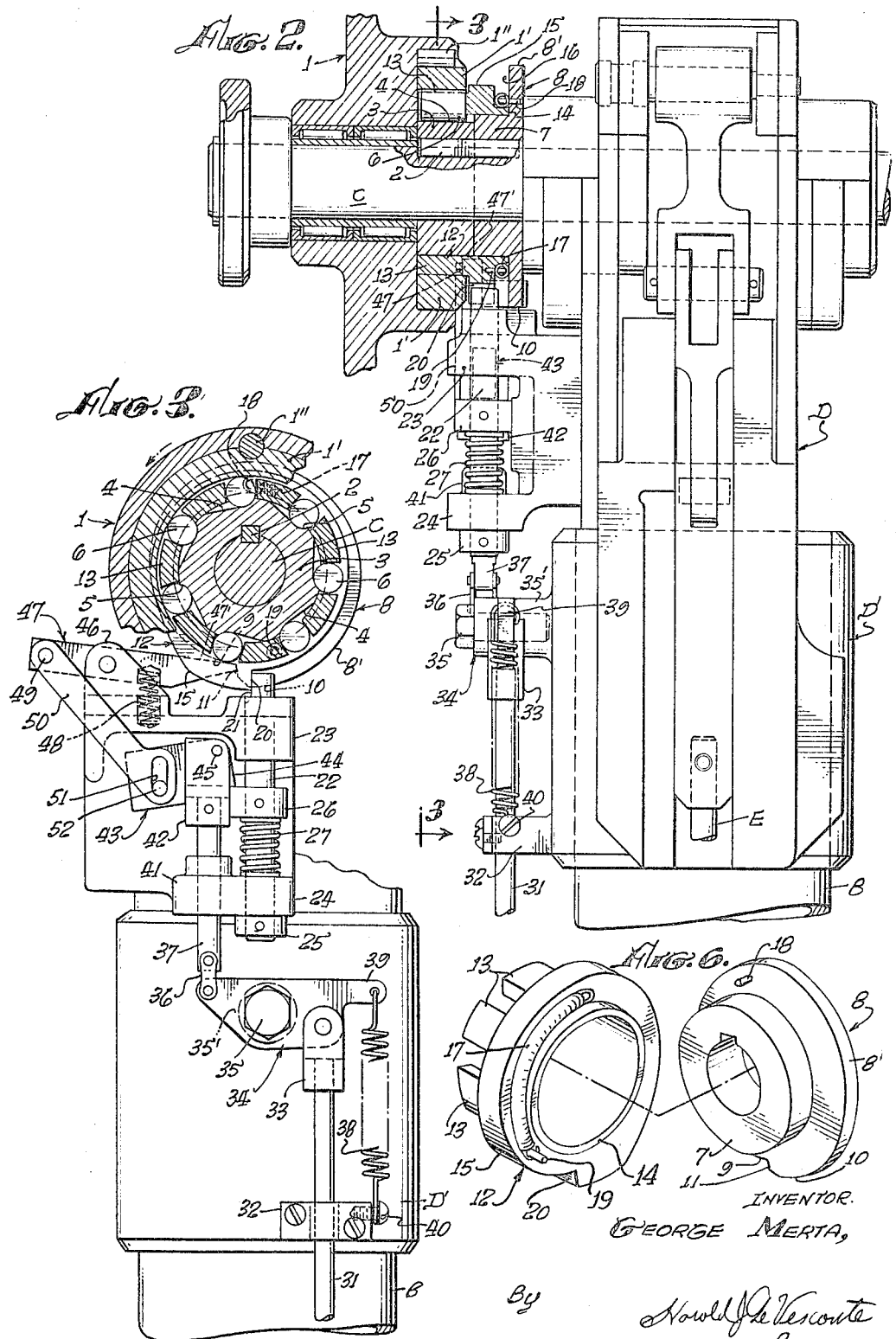

3,291,269
ONE REVOLUTION CLUTCH STOP MEANS
George Merta, Los Angeles, Calif., assignor to Trojan Rivet Corp., Glendale, Calif., a corporation of California
Filed Feb. 1, 1965, Ser. No. 429,251
5 Claims. (Cl. 192—27)

This invention relates to improvements in so-called "one revolution" clutch mechanisms such as are employed, for example, in various types of machine tools among which may be mentioned riveting machines and punching machines, the illustrated embodiment of the invention being shown as applied to a riveting machine.

In slower speed machines employing treadle operated one revolution clutches, such as punch presses, the operator can release the operating treadle in each cycle of operation without liability of repeat action of the machine. In higher speed machines, there is less time for the operator to release the treadle and failure to accommodate his own reactions to the speed of the machine can lead to double operation of the machine at times with resultant spoilage of the work. Assume that the speed of the operating wheel to which one side of the clutch mechanism is attached is operating at, say, 180 r.p.m. each operation must take place within a total of 20 seconds and actually, the operator should release the clutch tripping mechanism within, say, 10 seconds to allow the mechanism to return to clutch disengaging position.

With this factor in mind, the principal object of the invention is to provide a one revolution clutch and control means therefor effective during an operating rotation of the clutch to insure resetting of the stop means regardless of whether or not the resetting has been achieved by release of the actuating foot treadle by the operator.

With the foregoing principal object in mind, together with such additional objects and advantages as may subsequently appear, the invention resides in the parts, and in the construction, combination and arrangement of parts described by way of example, in the following specification of a presently preferred embodiment of the invention, reference being had to the accompanying drawings which form a part of said specification and in which drawings:

FIG. 1 is a perspective view of a riveting machine in which the said embodiment of the invention is incorporated, FIG. 2 is an enlarged fragmentary view taken in a direction normal to the axis of the operating shaft of the machine, certain portions thereof being shown in section in a vertical plane on the axial line of said shaft, FIG. 3 is a sectional side elevational view taken in the plane of the line 3—3 of FIG. 2 showing the parts of the clutch in their normal position of repose, FIG. 4 is a sectional view similar to FIG. 3 but showing the clutch parts at the instant of release by the operating foot pedal of the machine, FIG. 5 is a sectional view similar to FIGS. 3 and 4 but showing the release of the stop means during the excursion of the machine shaft through the one revolution permitted by actuation of the clutch, and FIG. 6 is a perspective exploded view of the principal clutch members and the actuating spring associated therewith.

Referring to the drawings, the invention is shown as applied to a riveting machine comprising a base A, a post B rising therefrom and carrying the riveting mechanism including an operating shaft C journaled in suitable bearings in a frame structure D and operating a reciprocable plunger E which reacts with a work support F to clinch a rivet supplied by a feeding mechanism G. The shaft C projects beyond the bearings in the frame structure and carries a flywheel freely rotatable thereon to which further reference will be made, said flywheel being constantly driven by suitable power means here shown as comprising a motor H connected thereto by a belt I. The flywheel 1 is coupled to and uncoupled from the shaft C by clutch means constituting a portion of the present invention and the clutch means causes the shaft C to make one complete revolution and then be locked against rotation in either direction until the clutch means is again energized or released for connecting the shaft to the flywheel 1.

The clutch is a sprag type clutch comprising a driving ring 1' mounted in a recess in the hub of the flywheel in concentric relation to the shaft C and is secured against relative rotation in the recess by any suitable means as for example, the dowel pin 1". Fixed on the shaft C by a key 2 and disposed within the ring 1' is the driven member 3 of the clutch having a face width substantially equal to the width of the ring and having a peripheral surface comprising a plurality of uniformly arranged, equally circumferentially spaced tangentially extending surfaces 4 terminating in outwardly curved shoulder portions 5. Disposed on each of said tangential surfaces 4 is one each of an equal number of rollers 6 which are moved into and out of clutching engagement between the said tangential surfaces and the inner face of the driving ring 1' by means presently to be described.

Mounted on the shaft C adjacent to the side of the driven member 3 which is remote from the flywheel 1 and secured to the shaft for rotation therewith by the key 2 is a hub 7 of the stop bar release cam 8, said cam comprising a radially extending flange having a peripheral cam face 8' which is of gradually increasing radial dimension in the direction opposite the direction of rotation of the cam and the shaft C' in use, said radial dimension extending from a minor radial dimension point 9 to a a major radial dimension point 10 and the said dimensions combining to form a generally radially extending stop shoulder 11 facing away from the direction of rotation of the shaft C. Freely mounted for limited oscillatory movement on the exterior peripheral surface of the hub 7 is the bearing portion of combined clutch actuator and stop member 12 including the circularly spaced, integrally formed roller actuating fingers 13 which extend laterally from said member between adjacent ones of the clutch rollers 6 and are operative, in a manner presently to be described, to cause said rollers to be moved into and out of driving engagement between the inner face of the ring 1' and the associated tangential faces 4 of the driven member 3.

The side of the actuator 12 adjacent to the cam 8 is formed with a thin hub portion 14 and the outer periphery of said hub portion 14 and the side wall of the actuator from which it projects combine with the adjacent side wall of the radially extending stop cam 8 to form a peripheral groove 16 and disposed in this groove is a tension spring 17 which has one end attached to a pin 18 projecting outwardly from the said adjacent side wall of the release cam 8 and has the other end thereof attached to a pin 19 projecting from the side of the stop cam 15, said spring being so disposed and tensioned as to constantly impose a bias tending to move the member 12 in a counter-clockwise direction relative to the member 8 as viewed in FIGS. 3, 4 and 5. Since the driven member 3 and stop bar release cam member 8 are fixedly mounted on the shaft, the spring induced relative rotary movement of the member 12 will cause the fingers 13 to force the roller 6 into wedging action between the converging faces comprising the tangential faces 4 of the driven member 3 and the inner face of the ring 1' and hence effect driving interrelation between the rotating ring and the driven member.

The stop cam 15 includes a radially extending stop face 20 extending between a minor radial point and a major radial point, the cam surface being, in effect, of a spiral configuration of one revolution, the said stop face facing in the direction of rotation of the shaft which, as viewed in FIGS. 3, 4 and 5, is counterclockwise. The face 20 is normally engaged by a complementary face 21 on an upwardly spring biased stop pin 22 which is reciprocable in spaced upper and lower bearings 23 and 24 on the machine frame; said pin projecting above the upper surface of the bearing 23 to engage the stop cam 15. The stop pin 21 on its lower end carries a stop collar 25 which is engageable with the lower face of the bearing 24 to limit the extent of upward movement of the stop pin. Between the bearings 23 and 24, the pin 21 carries a collar 26 and a compression spring 27 surrounding the pin and reacting between the collar 26 and bearing 24 tends constantly to urge the pin upwardly toward the cam 15. When the pin 22 is retracted out of the path of rotation of the cam, the cam is free to rotate and will be connected to the clutch means for rotation therewith as will presently be described.

The clutch engaging means includes the treadle 28 which is fulcrumed at 29 on the base A and which includes a rearwardly extending arm 30 connected to a reciprocable rod 31 extending parallel to the post B and which is guided adjacent the upper end thereof in a bearing 32 carried by a sleeve member D' fixed to the upper end of the post B and constituting the lower end of the machine frame structure D. The upper end of the rod 31 terminates in a yoke 33 which is pivotally connected to one end of a lever arm 34 pivoted between its ends on a bolt 35 projecting outwardly from a boss 35' on the sleeve member D'. The opposite end of the lever 34 is connected by a link 36 to the lower end of a vertically reciprocable latch operating plunger 37. A tension spring 38 extending between an extension 39 on the lever 34 and a screw 40 carried by a guide 32 imposes a clockwise bias on the lever 34 and hence through the rod 31 an upward bias on the treadle 28.

The plunger 37 is reciprocable in a bearing 41 formed in the same portion of the frame as the bearing 24 and above the bearing 41 the plunger carries a yoke 42 in which the forward end of a latch member 43 is pivotally mounted, said latch member having a lower face constituting a latching ledge 44 which projects between and retracts into the space between the arms of the yoke 42 as will later be described, and the pivot pin 45 by which said latch member is connected to the said yoke is disposed substantially directly above said ledge so that the rocking movement of said latch member about the pin 45 will impart a substantial horizontal movement of the latching ledge into and out of the space between the yoke arms.

Pivotally mounted on a bracket 46 on the frame D is the stop bar latch release lever 47 having one end extending below the cam face 8', said lever being biased into contact with said cam face by a compression spring 48 interposed between the pivotal mounting of said lever and the point of engagement with the cam face 8', said spring reacting between the under side of said lever and the bracket 46 and the end of face 47' of said lever being adapted to engage the cam face 11 as will be hereinafter explained. The other end of said lever is pivotally connected by a pin 49 to one end of a link 50 and the other end of said link is provided with a vertical slot 51 in which the end of a pin 52 projecting from the side of the end of the latch member remote from the latching ledge is movable.

Assuming that the machine is ready for operation with the flywheel rotating in the direction indicated by the arrow in FIG. 3, it will be noted that the stop cam face 20 is engaged with the face 21 of the pin 22 preventing rotation of the member 12 and that the end 47' of the lever 47 is likewise engaging the stop face 11 of the member 8. When both stop members are in engagement with their respective stop faces, the relative rotative positions of the members 8 and 12 is such as will hold the rollers 6 retracted as shown in FIG. 3. At the same time, as shown in FIG. 3, the latching ledge 44 is in engagement with the top face of the collar 26 on the pin 22. Upon pressing downwardly on the treadle 28, the upward movemen of the rod 31 and consequent counterclockwise movement of the lever 34 will move the plunger 37 downwardlly carrying the pin 22 downwardly by reason of the engagement of the latch with the collar 26. As soon as the top end of the plunger 22 clears the cam 20, the spring 17 moves the member 12 forward to the extent permitted by the engagement of the rollers 6 between the faces 4 and the inner face of the ring 1' locking the driven member to the ring for rotation therewith. The gradually increasing radial distance of the cam face 8' then presses downwardly on the end of the lever 47 which through the link 50 effects clockwise movement of the latch member 43 about the pivot pin 45 and at about the time the shaft C and the clutch have made an approximate half revolution as shown in FIG. 5, this movement has pulled the latching edge into the yoke 42 allowing the spring 27 to move the pin 22 up into the path of the approaching stop cam face 20. When the stop cam face 20 engages the pin, the continued counterclockwise movement of the shaft C relative thereto will continue until the high point 10 of the cam face 8' has passed beyond the end 47' of the lever 47 and at that point, the rollers are disengaged and the lever has moved in behind the face 11 to lock the clutch and the shaft C in the position shown in FIGS. 3 and 4. The reason for the slot 51 is to accommodate the situation in which, as usual, the operator releases the lever 28 before the lever 47 has been caused to disengage the latch. Under those conditions, the rear end of the latch must be free to move upwardly without opposition by the link 50. In either event, the latch will be certain to stop the clutch at the completion of a single revolution.

Thus there has been provided a one revolution clutch mechanism including devices operable as an incident to the operative excursion of the clutch to insure that the stop means will be operatively disposed for stopping the machine.

While in the foregoing specification there has been disclosed a presently preferred embodiment of the invention as applied to a specific machine, it will be appreciated that the invention can be employed on any machine having a cycle of operation capable of being determined by a clutch of this character and that the effectiveness of the clutch device is not dependent on the position thereof around the shaft nor whether the shaft be positioned horizontally or in any other attitude. Accordingly, the invention is not to be deemed to be limited to the precise details of construction thus shown by way of example and it will be understood that the invention includes as well, all such changes and modifications in the parts, and in the construction, combination and arrangement of parts as shall come within the purview of the appended claims.

I claim:

1. In a clutch mechanism for effecting a one revolution engagement between a constantly rotating driving component and a normally stationary driven component and which includes a driving member of the constantly rotating component, a shaft and a driven member secured thereto, and normally restrained, spring actuated devices connected to the driven member operative upon release of the restraint imposed thereon to effect one revolution interengagement of the driving and driven members with resultant rotation of the shaft, the combination of means for insuring stoppage of the driven member and shaft at the end of each one revolution excursion thereof, said means comprising an element fixed to and rotatable with the shaft and having a stop face extending radially of the axis of revolution and facing in the direction of rotation, a stop member movable into and out of the path of rotation of said face, a manually movable latch means normally engaging said stop member, manually operable means for bodily moving said latch means while engaged with said stop member with resultant retraction of said stop member out of said path of rotation of said stop face, a spring normally urging said stop member into the path of said stop face, a cam rotatable with said driven member and devices operated by said cam responsive to rotation of the shaft imparted by said driven member and operative during a rotative excursion thereof to disengage said latch means at a time when said stop member is retracted from said path with resultant release of said stop member to the bias of said spring with resultant spring induced return of said stop member into said path of rotative movement of said stop face.

2. A one revolution clutch stop mechanism as claimed in claim 1 in which said cam operated devices include devices effective upon disengagement of said clutch components to interengage with a second stop face rotating with said driven member and disposed to face in the direction opposite said first named stop face and by said interengagement to prevent reverse rotation of said driven member and of the shaft to which it is fixed.

3. A one revolution clutch stop mechanism as claimed in claim 1 in which said stop member is mounted for reciprocation on the frame of the machine with which the clutch mechanism is associated, in which said latch means includes a latch member pivotally mounted in a yoke mounted for reciprocation in a line parallel to and adjacent to the path of movement of said stop member, and in which said cam operated devices includes a pivoted lever actuated by a cam rotatable with said clutch driven member and connected to said latch member for rocking said latch member on the pivotal mounting thereof in a direction to effect disengagement from said stop member.

4. A one revolution clutch stop mechanism as claimed in claim 3 in which spring means is constantly operative to urge said yoke in a direction opposite the movement thereof to stop disengaging position, and in which the engagement between said stop member and said latch means is such that return of said latch means to the normally occupied position thereof after having been disengaged by said cam operated devices, serves additionally to re-engage said latch means with said stop member for the next release of the one revolution clutch.

5. A one revolution clutch stop means as claimed in claim 3 in which a spring associated with said lever serves both to yieldingly maintain said latch in stop member engaging position and to maintain said lever in engagement with the operating cam therefor.

References Cited by the Examiner

UNITED STATES PATENTS

| 1,578,370 | 3/1926 | Ross | 192—27 |
| 2,600,636 | 6/1952 | Goetz et al. | 192—33 |

DAVID J. WILLIAMOWSKY, *Primary Examiner.*

A. T. McKEON, *Assistant Examiner.*